United States Patent [19]

Burke

[11] 3,754,941

[45] Aug. 28, 1973

[54] REMOVAL OF METALLIC STAINS FROM PORCELAIN SURFACES

[75] Inventor: Richard L. Burke, San Diego, Calif.

[73] Assignee: Colgate-Palmolive Company, New York, N.Y.

[22] Filed: Jan. 4, 1971

[21] Appl. No.: 103,832

Related U.S. Application Data

[63] Continuation-in-part of Ser. No. 668,668, Sept. 18, 1967.

[52] U.S. Cl............................ 106/3, 51/307, 51/308
[51] Int. Cl............................................... C09g 1/02
[58] Field of Search ..................... 106/34, 3; 51/295, 51/298, 303, 304, 307, 308, 309

[56] References Cited
UNITED STATES PATENTS

| | | | |
|---|---|---|---|
| 3,385,682 | 5/1968 | Lowen .................................. | 51/307 |
| 2,907,649 | 10/1959 | Berkeley et al...................... | 51/304 |
| 3,248,235 | 4/1966 | Pryor et al.............................. | 106/3 |
| 3,246,970 | 4/1966 | Zimmerman......................... | 51/307 |
| 2,625,514 | 1/1953 | Kirschenbauer..................... | 51/308 |
| 3,429,080 | 2/1969 | Lachapelle........................... | 51/307 |

Primary Examiner—Joseph L. Schofer
Assistant Examiner—David A. Jackson
Attorney—Herbert S. Sylvester, Murray M. Grill, Norman Blumenkopf, Ronald S. Cornell, Thomas J. Corum, Richard N. Miller, Robert L. Stone and Kenneth A. Koch

[57] ABSTRACT

This disclosure relates to cleansing compositions having particular utility as a metallic stain remover from hard surfaces such as porcelain, comprising an oxidant capable of oxidizing the metal in a practical time such as the metallic ions ferric, stannous, cupric and mercuric and non-metallic oxidants such as hydrogen peroxide, a flouride solubilizer and a halide promotor, said composition having a pH of 0.5 – 5. Additives such as detergents, perfumes, fillers, colorants, etc. may be included provided they do not adversely affect the stain removing properties of the composition. Although aluminum pot marks are most often encountered in normal household cleaning, said cleansers are effective against other metallic stains such as iron, tin, magnesium, etc.

3 Claims, No Drawings

REMOVAL OF METALLIC STAINS FROM PORCELAIN SURFACES

This application is a continuation-in-part of application Ser. No. 668,668, filed Sept. 18, 1967.

This invention relates to compositions particularly adapted for removal of metallic stains such as aluminum pot marks from porcelain or ceramic surfaces.

There are many household cleansers on the market which have good food stain removal ability but depend upon abrasive action with or without alkalinity for aluminum pot mark removal from porcelain or enamel surfaces such as sinks or similar fixtures. Chemical removal of aluminum from aforesaid surfaces by cleansers is minimal, if any. This difficulty in removing metallic stains from ceramic surfaces is increased as the sink or like fixture becomes old and more damaged from use. A good stain removal cleanser must be effective in a very short time because in normal use the contact time between the cleanser and the stain is much less than a minute. The complete removal of the stain depends upon the condition of the surface, the severity of the stain, and the speed of the removal system.

It has now been found that aluminum pot marks and other metallic stains such as tin, magnesium and iron can be effectively removed in a practical time from porcelain or ceramic surfaces, chemically, by a composition containing as the essential ingredients an oxidant, a solubilizer and a promotor. The mechanism of the chemical reaction is oxidation and solubilization. The result of the chemical reaction, in the case of aluminum pot marks, is the conversion to $Al^{+3}$ or some other soluble form of the ion.

More specifically, the cleansing composition for removal of metallic stains from hard surfaces comprises a metallic salt oxidant, a fluoride solubilizer and a halide activator in an inert carrier, and having a pH of 0.5 to 5. The lower pH limit is determined by a desire to avoid irritation to housewives' hands, while the upper limit is determined by the precipitation of the heavy metal hydroxide thereby removing the metallic ion for effective oxidation.

The oxidant ingredient must be capable of oxidizing the metal in the stain such as aluminum, in a practical time. Suitable metallic ions are those with higher oxidation potentials such as ferric, stannous, cupric, mercuric, auric, and silver. The most effective metallic salt is mercuric chloride, followed by cupric chloride, stannous chloride, ferric chloride, auric chloride and silver nitrate. The anion is not critical and consequently any suitable salt of the aforementioned cations may be used provided the selected salt is water-soluble to the extent of at least about 2 percent by weight thereof in water, and yields the cation of the metal in water. The most effective metallic salt, mercuric, is unique because it forms a liquid metal, but its ability to remove aluminum stains is not due to the formation of a liquid metal. Metallic ions with oxidation potentials closer to aluminum are probably effective over a long time period but for removal of aluminum stains in a practical time, ferrous ion was only marginally effective and zinc ion showed little or no reaction. Non-metallic oxidants, such as sodium perchlorate and potassium iodate show marginal removal at the desired use pH's. These latter oxidants react more rapidly in stronger acid solutions, which is undesirable for household use. The hydrogen ion itself present at the acid pH assists in the oxidation of the metal stain. Hydrogen peroxide was found to be moderately effective. The amount of oxidant found effective herein constitutes about 2-20 percent by weight of the total composition.

The fluoride solubilizer must be combined with the metallic oxidant to insure the removal of the appropriate metal that normally (without the solubilizer) deposits on the metallic stain during the oxidation reaction. In addition the fluoride removes the metallic ion, such as aluminum ion, or an oxide coating, so that the aluminum surface is available for further reaction (oxidation). The fluoride solubilizer may also play a part in altering the adherence force of the metal stain to the hard surface, whereby the attachment between the aluminum stain and the ceramic surface is broken. The solubilizer may also be considered a surface cleaner and can be a complex fluoride or the fluoride ion itself. Effective complex fluorides include ionic compounds such as sodium fluosilicate (or silicofluoride) and more soluble fluosilicates such as ammonium, magnesium and zinc; the fluorophosphates inclusive of the mono- and di - fluorophosphates; potassium zirconium fluoride; the hexafluotitanates such as benzyltrimethyl ammonium hexafluotitanate; sodium fluoborates, etc. Simple fluorides include sodium fluoride, and ammonium bifluoride. The soluble fluorides and fluosilicates (i.e. soluble to the extent of at least 0.5 percent and preferably 2 percent in water) are the most effective solubilizers. The fluoride solubilizer constitutes about 0.5 – 10 percent by weight of the composition.

Another essential ingredient of the composition is a halide promotor such as chloride, bromide and iodide, with the chloride being preferred. The halide activates the metallic salt oxidant whereby stain removal is increased, whereas other anions such as nitrates and sulfates tend to inhibit aluminum removal. The function of the promotor is to speed up the stain removal and to obtain sufficient cleaning in the required time. In some cases, moderate stain removal is obtained without the chloride promotor. Thus, it is apparent that anion effects must be considered and tested when formulating a complete cleanser. The halide promotor constitutes about 1-20 percent by weight of the total composition. Suitable promotors include any water-soluble salt, preferably inorganic, wherein the anion is chloride, bromide or iodide and the salt yields such ions in water. Illustrative compounds are the water-soluble alkali metal (e.g. sodium, potassium, lithium, etc.) chlorides, bromides and iodides and the water-soluble alkaline earth (magnesium, calcium, barium) bromides, chlorides and iodides.

Compounds may be utilized which are capable of performing more than one function such as cupric chloride, cupric bromide, stannous chloride, ferric chloride and auric chloride which combine the oxidant and promotor in a single compound; cupric fluosilicate, ferric fluosilicate, silver fluoride, silver fluosilicate and stannous fluoride, which combine the oxidant and the solubilizer in a single compound.

The pH of the cleansing composition is preferably 0.5 to 5 although lower pH's (higher hydrogen ion concentration) will still be effective. The lower pH limit is determined by the acid concentration suitable for use in a general household product. More specifically the lower limit is the point beyond which the porcelain enamel surface is attacked and the housewife's hands are irritated. The upper pH limit is determined by the precipitation of the metallic hydroxide and differs for each metal oxidant utilized. For example, for cupric ion the hydroxide begins to precipitate at about pH 4, while for the ferric ion the hydroxide precipitates at about pH 2. For non-metallic oxidants, the upper pH range is limited by the efficiency of the oxidant.

This cleansing composition may include other ingredients such as surface active agents, (anionic, cationic and nonionic) perfumes, fillers, diluents, abrasives, colorants, etc. useful in household cleansers in widely varying proportions. However, where additives are used they should be selected and proportioned so as not to adversely affect the stain removal property of the composition. Generally from about 0.1 percent to about 20 percent by weight of these other ingredients may be used.

Any suitable water-soluble organic surface agent which is non-reactive with the metal salt oxidant and fluoride ingredients may be utilized. The non-ionic detergents are preferred since they are completely non-reactive with the heavy metal ions of the oxidant ingredient. Suitable non-ionic detergents include the alkylene oxide condensation products of hydrophobic compounds such as ethylene oxide condensates with higher fatty acids, higher fatty acid amides, higher fatty alcohols or alkyl aryl hydrocarbons, having at least 5 and usually from 5 to 30 ethoxy groups per molecule i.e. coconut fatty acid monoethanol amide ethoxylated with 2 moles ethylene oxide, octyl phenoxy polyethoxy ethanol having 10 moles ethylene oxide.

The cationic quaternary compounds may also be utilized herein, since they do not adversely affect the oxidizing action of the metallic salt. Suitable cationic detergents include the quaternary ammonium compounds such as stearyl dimethyl benzyl ammonium chloride, N-difatty dimethyl quaternary ammonium chloride, i.e. N-distearyl dimethyl ammonium chloride.

The anionic detergents tend to react with the heavy metal ions, thereby reducing the efficacy of the cleanser. However, the phosphate esters such as the sodium salt of phosphated nonyl phenol condensed with 6 moles of ethylene oxide, has been found to be operable in this system. Other anionics can be used provided they do not react to form an insoluble product or a complex which ties up the metal ion. Thus, it is apparent, that the surface active agent utilizable herein, must not react with the heavy metal ion to remove the latter from being effective in the present oxidizing system.

The stain-removing ingredients of the instant invention may be incorporated into an abrasive scouring powder such as silex (ground quartz or silica), feldspar, pumice, chalk, tripoli, kieselguhr, diatomaceous earth and the like. Said active ingredients may also be added to an aqueous solution or suspension to give a liquid composition. Suitable materials may be added to yield a cream or paste. Thus, it is apparent that the instant composition may be in the form of a liquid, semi-liquid or solid by the addition of suitable ingredients which do not adversely affect the metallic stain removal properties thereof. The metallic salt oxidant-fluoride solubilizer systems retain their stability, both as to stain removal performance and pH, for protracted periods of time (tested for 65 days at 120°F) with and without additives such as abrasives, surface active agents, etc.

The following examples are illustrative of the invention and it will be understood that the invention is not limited thereto. Parts are by weight unless otherwise indicated.

EXAMPLE I

| Ingredients | Weight percent |
|---|---|
| Cupric chloride dihydrate | 10% |
| Zinc fluosilicate hexahydrate | 5 |
| Inert solid or water | 85 |

This solution which has a pH of 3 is tested for aluminum stain removal by contacting the above composition with an etched porcelain white tile stained with aluminum pot marks, for one minute. This composition results in 95 percent removal of stain which is far superior to the 30 percent stain removal obtained with a zinc fluosilicate solution, or 0 percent stain removal with a cupric chloride dihydrate solution. The effective removal of the aluminum marks by this static test in one minute will give excellent performance in normal use since the stain is far more severe than usually encountered in household cleaning. Only severely damaged sinks will require a longer time for complete removal of stain.

EXAMPLES II – VI

| Ex. | Oxidant | Solubilizer | pH | 2 minute static test Al stain % removal |
|---|---|---|---|---|
| II | 2% Hg $Cl_2$ | 2% $Na_2 Si F_6$ | 3.5 | 100 |
| III | 2% Cu $Cl_2 \cdot 2H_2O$ | " | 3.3 | 85 |
| IV | 2% Sn $Cl_2 \cdot 2H_2O$ | " | 3.3 | 85 |
| V | 2% Fe $Cl_3 \cdot 6H_2O$ | " | 1.3 | 70 |
| VI | 2% Au $Cl_3$ | " | 2.2 | 70 |

The above compositions dissolved in water exhibit good stain removal properties, whereas compositions containing the oxidant without the fluoride solubilizer do not remove any of the aluminum stain.

EXAMPLES VII– XV

| Ex. | Oxidant | Solubilizer | pH | 1 minute static test % removal of Al stain |
|---|---|---|---|---|
| VII | 2% Cu $Cl_2 \cdot 2H_2O$ | 2% $ZnSiF_6 \cdot 6H_2O$ | 3.4 | 85 |
| VIII | " | 2% Mg Si $F_6 \cdot 6H_2O$ | 3.1 | 85 |
| IX | " | 2% $(NH_4)_2$ Si $F_6$ | 3.4 | 85 |
| X | 5% Cu $Cl_2 \cdot 2H_2O$ | 1% Zn Si $F_6 \cdot 6H_2O$ | 3.0 | 80 |
| XI | 10% Cu $Cl_2 \cdot 2H_2O$ | 1% Zn Si $F_6 \cdot 6H_2O$ | 2.9 | 80 |
| XII | 10% Cu $Cl_2 \cdot 2H_2O$ | 2% Zn Si $F_6 \cdot 6H_2O$ | 2.9 | 95 |
| XIII | 10% Cu $Cl_2 \cdot 2H_2O$ | 7% Zn Si $F_6 \cdot 6H_2O$ | 2.9 | 95 |
| XIV | 10% Fe $Cl_3 \cdot 6H_2O$ | 5% Zn Si $F_6 \cdot 6H_2O$ | 0.8 | 80 |
| XV | 10% Sn $Cl_2 \cdot 2H_2O$ | 5% Zn Si $F_6 \cdot 6H_2O$ | 1.2 | 95 |

The above compositions are admixed with either an inert solid or water to make a superior aluminum stain-removing cleanser.

EXAMPLE XVI

| Ingredients | % Weight |
|---|---|
| Cu $(NO_3)_2 \cdot 3H_2O$ | 2.9 |
| $Na_2Si F_6$ | 2.0 |
| Na Cl | 1.4 |
| Inert solid or water | 93.7 |

This composition, which has a pH of 3.8 gives 85 percent aluminum stain removal in a one minute static test.

EXAMPLES XVII – XXI

| Ex. | Oxidant | Solubilizer | pH | Static 5 removal 1 Minute |
|---|---|---|---|---|
| XVII | 14% Cu $Cl_2 \cdot 2H_2O$ | 1% $Na_2$ Si $F_6$ | 2.6 | 90 |
| XVIII | 18% Cu $Cl_2 \cdot 2H_2O$ | " | 2.5 | 95 |
| XIX | " | 0.5 $Na_2$ Si $F_6$ | 2.5 | 80 |
| XX | 14% Sn $Cl_2 \cdot 2H_2O$ | 1% $Na_2$ Si $F_6$ | 1.2 | 70 |
| XXI | 18% Sn $Cl_2 \cdot 2H_2O$ | " | 1.1 | 85 |

These examples illustrate that better performance is obtained at higher metallic ion concentrations.

EXAMPLES XXII – XXVIII

| Ex. | Oxidant | Solubilizer | pH | Static % removal 1 Minute |
|---|---|---|---|---|
| XXII | 5% Cu Cl$_2$·2H$_2$O | 2% NH$_4$HF$_2$ | 4 | 95 |
| XXIII | 10% Cu Cl$_2$·2H$_2$O | 10% Na B F$_4$ | 0.8 | 90 |
| XXIV | " | " | 2.5 | 75 |
| XXV | 2% Cu Cl$_2$·2H$_2$O | 2% Na F | 1.1 | 65 |
| XXVI | 1% Fe Cl$_3$·6H$_2$O | 10% Na B F$_4$ | 1.5 | 80 |
| XXVII | 10% Fe Cl$_3$·6H$_2$O | " | 0.6 | 80 |
| XXVIII | 20% Fe Cl$_3$·6H$_2$O | 2% Na B F$_4$ | 0.5 | 85 |

EXAMPLE XXIX

| Ingredients | % Weight |
|---|---|
| Oxalic Acid | 2 |
| Na$_2$ Si F$_6$ | 2 |
| Na Cl | 2 |
| H$_2$O$_2$ | 3 |
| Water or inorganic solid | 91 |

This composition, at a pH of 1.1 gives 80% aluminum stain removal and 85% rust removal in a 2 minute static test.

EXAMPLES XXX – XXVI

A cleanser containing 10% Cu Cl$_2$·2H$_2$O and 1% Na$_2$ Si F$_6$, at a pH of 2.9 gives 85% aluminum stain removal in 1 minute, 85% tin stain removal in 15 seconds, and 95% tin removal in 1 minute. The addition of 5% sodium salt of organic phosphate ester, or 5% N-distearyldimethyl ammonium chloride, or 56% silex or 5% octyl phenoxy polyethoxy ethanol, or 5% stearyl dimethyl benzyl ammonium chloride or 10% nitrilotriacetic acid does not adversely affect the stain removal properties of the cleanser.

EXAMPLE XXXVII

A cleanser containing 10% Cu SO$_4$, 5% Na Cl and 1% Na$_2$ Si F$_6$, at a pH of 3.4, gives 70% removal of tin stain in 15 seconds, 85% tin stain removal in 30 seconds and 90% tin stain removal in 1 minute, as well as superior aluminum stain removal.

EXAMPLE XXXVIII

A cleansing composition is prepared containing 4% Cu Cl$_2$·2H$_2$O, 4% Na$_2$ Si F$_6$, 0.02% Heliogen Blue, 0.1% perfume, 3% coconut fatty acid monoethanolamide ethyoxylated with 2 moles ethylene oxide, 50% silex and the remainder water, at a pH of 3.2 – 3.8. This cleanser which exhibits excellent aluminum stain removal properties is stable over a long period of time (aged 37 days at 120°F) with no appreciable change in pH or reduction in aluminum stain removal efficiency.

EXAMPLE XXXIX A – D

The procedure of Example I is repeated using in place of the ingredients listed therein the following in the indicated amounts:

A. Cupric fluosilicate — 5%; Na Cl — 5% — H$_2$O — 90%
B. Silver fluoride — 10% — H$_2$O — 90%
C. Cupric fluosilicate — 15% — Na Cl — 10% — Silex — 50% H$_2$O — balance
D. Stannous Fluoride — 20% — Mg Cl$_2$ — 10% — H$_2$O — 70%

Excellent stain removal is obtained in each instance.
In the examples, the silex employed has a particle size such that the particles are less than 0.15mm and over 90 percent pass through a sieve having 0.074mm openings.

Although the present invention has been described with reference to particular embodiments and examples, it will be apparent to those skilled in the art that variations and modifications of this invention can be made and that equivalents can be substituted therefor without departing from the principles and true spirit of the invention.

What is claimed is:

1. A composition for removing metallic stains of aluminum, magnesium, tin and iron from ceramic surfaces consisting essentially of
   a. about 2 to 20 percent by weight of a water-soluble metal salt oxidant selected from the group consisting of mercuric chloride, cupric chloride, stannous chloride, ferric chloride, auric chloride and silver nitrate,
   b. about 0.5 to 10 percent by weight of a solubilizer selected from the group consisting of ammonium, magnesium, zinc and sodium fluorosilicate, sodium fluoride and ammonium bifluoride and
   c. about 1 to 20 percent by weight of a water-soluble halide promoter selected from the group consisting of sodium, potassium, magnesium, and calcium chlorides, bromides and iodides; said ingredients of a, b, and c being present in an inert carrier selected from the group consisting of water, silex, feldspar, pumice, tripoli, kieselguhr, diatomaceous earth and chalk and said composition having a pH of about 0.5 to 5 in an aqueous medium.

2. A composition for removing metallic stains of aluminum, magnesium, tin and iron from ceramic surfaces consisting essentially of a water-soluble metal salt oxidant, a solubilizer and a water-soluble halide promoter wherein said oxidant and solubilizer are present in 2 to 20 percent by weight and are selected from the group consisting of cupric fluorosilicate, ferric fluorosilicate, silver fluoride, silver fluorosilicate, and stannous fluoride; said halide promotor is present in about 1 to 20 percent by weight and is selected from the group consisting of sodium, potassium, magnesium and calcium chlorides and bromides, and said oxidant, solubilizer, and promoter being present in an inert carrier selected from the group consisting of water, silex, feldspar, pumice, tripoli, kieselguhr, diatomaceous earth and chalk and said composition having a pH of about 0.5 to 5 in an aqueous medium.

3. A composition for removing metallic stains of aluminum, magnesium, tin and iron from ceramic surfaces consisting essentially of a water-soluble metal salt oxidant, a solubilizer and a water-soluble halide promoter wherein the oxidant and promoter are present in about 2 to 20 percent and are selected from the group consisting of cupric chloride, cupric bromide, stannous chloride, ferric chloride and auric chloride; and the solubilizer is present in about 0.5 to 10 percent by weight and selected from the group consisting of ammonium, magnesium, zinc and sodium fluorosilicate, sodium fluoride and ammonium bifluoride, and said oxidant, solubilizer, and promoter being present in an inert carrier selected from the group consisting of water, silex, feldspar, pumice, tripoli, kieselguhr, diatomaceous earth, and chalk and said composition having a pH of about 0.5 to 5 in an aqueous medium.

* * * * *